United States Patent
Srivastav et al.

(10) Patent No.: US 10,237,183 B2
(45) Date of Patent: Mar. 19, 2019

(54) DETECTING TETHERING IN NETWORKS

(71) Applicant: GUAVUS, INC., San Mateo, CA (US)

(72) Inventors: Anubhav Srivastav, Delhi (IN); Manjinder Aulakh, Punjab (IN); Ankush Garg, Bathinda (IN); Anant Malhotra, Delhi (IN); Anita Tailor, Gurgaon (IN)

(73) Assignee: Guavus, Inc., San Mateo, CA (US)

( * ) Notice: Subject to any disclaimer, the term of this patent is extended or adjusted under 35 U.S.C. 154(b) by 0 days.

(21) Appl. No.: 15/283,870

(22) Filed: Oct. 3, 2016

(65) Prior Publication Data
US 2018/0097729 A1   Apr. 5, 2018

(51) Int. Cl.
| | | |
|---|---|---|
| H04W 40/02 | (2009.01) | |
| H04L 12/743 | (2013.01) | |
| H04L 29/12 | (2006.01) | |
| H04L 29/06 | (2006.01) | |
| H04W 4/80 | (2018.01) | |

(52) U.S. Cl.
CPC ...... *H04L 45/7453* (2013.01); *H04L 61/1511* (2013.01); *H04L 61/251* (2013.01); *H04L 69/16* (2013.01); *H04W 4/80* (2018.02)

(58) Field of Classification Search
CPC ............. H04L 29/12066; H04L 45/00; H04L 61/1511; H04L 12/4633; H04L 29/12009; H04L 29/12783; H04L 61/35; H04L 69/16; H04L 69/167; H04L 2212/00; H04W 8/26; H04W 40/00; H04W 80/00; H04W 80/04; H04W 80/045
See application file for complete search history.

(56) References Cited

U.S. PATENT DOCUMENTS

| | | | | |
|---|---|---|---|---|
| 8,918,843 | B1 * | 12/2014 | Vivanco | H04W 12/12 709/229 |
| 2002/0157024 | A1 * | 10/2002 | Yokote | H04L 63/0807 726/6 |
| 2004/0179508 | A1 * | 9/2004 | Thubert | H04L 29/06 370/349 |

(Continued)

*Primary Examiner* — Jung Liu
(74) *Attorney, Agent, or Firm* — Michael A. Kerr; Kerr IP Group, LLC (57) ABSTRACT

A system for detecting a computing device tethered to a mobile device is described. The system includes communicatively coupled the computing device to the mobile device with an IPv4 domain protocol. Additionally, the mobile device is communicatively coupled to the mobile data network with an IPv6 domain protocol. A network module, associated with a mobile data network, receives a DNS request packet from the mobile device. An IPv6 hostname and an IPv6 destination address is associated with the DNS response packet, when the DNS response packet is associated with the IPv6 address. Additionally, an IPv4 hostname and an IPv4 destination address is associated with the DNS response packet, when the DNS response packet is associated with the IPv4 address. A communication packet, generated by the mobile device, is also received by the network module. The communication packet includes a destination address and a hostname. The computing device is tethered to the mobile device when the destination address matches the IPv4 destination address and the hostname does not match the IPv6 hostname.

20 Claims, 4 Drawing Sheets

(56) References Cited

U.S. PATENT DOCUMENTS

| | | | | |
|---|---|---|---|---|
| 2005/0008032 | A1* | 1/2005 | Yamamoto | H04W 80/045 370/466 |
| 2006/0062248 | A1* | 3/2006 | Huang | H04L 29/12066 370/466 |
| 2007/0076623 | A1* | 4/2007 | Aloni | G06F 13/128 370/252 |
| 2007/0211723 | A1* | 9/2007 | Patel | H04W 80/06 370/392 |
| 2010/0267368 | A1* | 10/2010 | Masputra | H04M 1/72527 455/414.1 |
| 2011/0023105 | A1* | 1/2011 | Islam | H04L 45/52 726/11 |
| 2012/0158929 | A1* | 6/2012 | Shlomo | H04W 36/0033 709/222 |
| 2012/0240197 | A1* | 9/2012 | Tran | H04L 63/1416 726/4 |
| 2013/0254264 | A1* | 9/2013 | Hankinson | H04L 29/06047 709/203 |
| 2013/0301598 | A1* | 11/2013 | Holm | H04L 29/12066 370/329 |
| 2014/0258491 | A1* | 9/2014 | Forristal | H04L 45/741 709/223 |
| 2015/0282040 | A1* | 10/2015 | Daniel | H04W 40/02 370/329 |

* cited by examiner

DETECTING TETHERING IN NETWORKS

FIELD

The present invention relates to a system and method for detecting computing devices tethering to mobile device. More specifically, the system and method detect mobile device tethering when mobile spoofing applications loaded on the mobile device attempt to tether an unauthorized computing device to the mobile device.

BACKGROUND

Tethering refers to the process of using a wireless phone, e.g. a smartphone, as modem to connect one or more computing device to the Internet. For example, an illustrative laptop computer may be communicatively coupled, i.e. tethered, to a smartphone—and the smartphone is used as a modem. The illustrative laptop computer may be tethered to the illustrative smartphone with an illustrative wired USB connection or an illustrative wireless Bluetooth connection or an illustrative wireless WiFi/Hotspot connection.

Communication Service Providers (CSPs), which are also referred to as "wireless Internet service providers," need to identify when a subscriber tethering happening on their network. Typically, the CSP and subscriber enter into a contract to support tethering. Many wireless Internet service providers charge an additional fee for subscribers that connect to the Internet using their mobile devices because the tethered computing devices use more data than the mobile device uses.

Regretfully, many subscribers resort to unauthorized tethering by using "spoofing" applications to avoid the wireless Internet service provider tethering limits. Smartphone spoofing applications hide the subscriber's unauthorized tethering usage by "spoofing" the type of traffic that is presented to the network from the subscriber's smartphone. "Spoofing" refers to the process of enabling an unauthorized device to access a service, e.g. data plan to access Internet, by identifying the unauthorized device to be an authorized device.

Wireless Internet service providers have developed tools to detect the unauthorized tethering, however, these techniques do not work for IPv6 mobile networks.

Modern wireless Internet service providers are migrating from IPv4 to IPv6 mobile networks because of the need for additional IP addresses for wireless devices such as smartphone, IoT devices and other such wired and wireless devices accessing the Internet. Internet Protocol version 6 (IPv6) is the sixth revision to the Internet Protocol and the successor to Internet Protocol version 4 (IPv4). IPv6 functions similarly to IPv4 in that it provides the unique, numerical IP addresses necessary for Internet-enabled devices to communicate; however, IPv6 includes one major difference, namely, it utilizes 128-bit addresses.

Due to modern wireless Internet using IPv6 mobile network, it is challenging to detect unauthorized tethering because the TCP/IP stack for IPv6 is different from the TCP/IP stack for IPv4. More specifically, most solutions that detect unauthorized tethering rely on detecting an operating system signature presented in TCP/IP packets or based on a User-Agent field of HTTP traffic. These detection methods work only when the illustrative smartphone simply acts as a router/NAT for the tethered traffic or the HTTP User-Agent field is not modified.

Handset vendors and companies developing mobile operating systems have been improving their systems and methods to detect spoofing applications. For example, the handset vendors and companies developing mobile operating systems have been preventing spoofing applications from being installed on smartphones and handsets. Additionally, the handset vendors and companies developing mobile operating systems have been preventing spoofing application from making changes to the tethered traffic in an unexpected manner.

However, there continue to be various challenges for detecting unauthorized tethering. For example, if the tethered device (e.g. the laptop) modifies the User-Agent field of the HTTP traffic, then unauthorized tethering cannot be detected. Additionally, when spoofing application for unauthorized tethering are installed on the smartphone, the spoofing application can modify some of the IP header parameters such as TTL; and the unauthorized tethering cannot be detected. Furthermore, when the spoofing applications run a proxy server that initiates a TCP connection from the smartphone and makes the proxy server signature appear to be the same signature as the natively originated signatures, then the unauthorized tethering cannot be detected.

Thus, there is a need for a system and method that detects tethering to IPv6 mobile networks that can be managed and controlled by the wireless Internet service provider and that do not rely on handset vendors and companies that develop mobile operating systems.

SUMMARY

A system and method for detecting a computing device tethered to a mobile device is described. The method includes communicatively coupling the computing device to the mobile device with an IPv4 address and communicatively coupling the mobile device to a mobile data network with an IPv6 address. The method then proceeds to enable a network module, which is associated with a mobile data network, to receive a DNS response packet associated with the mobile device. The method determines that an IP address for the DNS response packets is associated with one of an IPv6 address and an IPv4 address. The method then proceeds to add an IPv6 hostname and an IPv6 destination address when the DNS response packet is associated with the IPv6 address. Additionally, the method adds an IPv4 hostname and an IPv4 destination address when the DNS response packet is associated with the IPv4 address.

The method then proceeds to detect a TCP packet generated by the mobile device with the network module. The TCP packet includes a TCP destination address The method then determines the computing device is tethered to the mobile device with the network module, when the TCP destination address matches the IPv4 destination address and the TCP hostname does not match the IPv6 hostname.

A system for detecting a computing device tethered to a mobile device is also described. The system includes a network module associated with a mobile data network. The system includes the computing device being communicatively coupled to the mobile device with an IPv4 domain protocol. Additionally, the mobile device is communicatively coupled to the mobile data network with an IPv6 domain protocol. The network module receives a DNS response packet, which is associated the mobile device. An IP address associated with the DNS response packet is selected from at least one of an IPv6 address and an IPv4 address. An IPv6 hostname and an IPv6 destination address is associated with the DNS response packet, when the DNS response packet is associated with the IPv6 address. Additionally, an IPv4 hostname and an IPv4 destination address is associated with the DNS response packet, when the DNS response packet is associated with the IPv4 address.

A TCP packet generated by the mobile device communicating with the network module is received by the network module. The TCP packet includes a TCP destination address. The computing device is tethered to the mobile device when the TCP destination address matches the IPv4 destination address and the TCP hostname does not match the IPv6 hostname.

More generally, the system and method described above is not limited to a TCP packet and may include detecting a communication packet generated by the mobile device, wherein the communication packet includes a destination address and/or a hostname. Additionally, the system and method determines the computing device is tethered to the mobile device, when the destination address matches the IPv4 destination address and the hostname does not match the IPv6 hostname.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the system and method described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

The systems and methods presented herein overcome the challenges caused by sophisticated spoofing applications for unauthorized tethering related to IPv6 mobile networks. By way of example and not of limitation, the systems and method presented herein are related to the field of network tethering detection, particularly, tethering detection performed via Domain Name System (DNS) and Transmission Control Protocol (TCP) correlation. The systems and methods presented herein are performed by network module that is associated with a mobile data network.

For purposes of this patent, the terms mobile data network, Communication Service Providers (CSPs), Wireless Internet Service Providers (WISPs), carrier network, operator network and operators may be used interchangeably.

A Domain Name System (DNS) is a standard name service that enables applications and users to connect to hosts in TCP/IP based networks by specifying a name. Thus, DNS makes it possible to assign domain names to organizations independent of the routing of the numerical IP address. DNS is a hierarchically distributed database that creates hierarchical names that can be resolved to IP addresses. The IP addresses are then resolved to MAC addresses.

A DNS Query is generated when the client needs to resolve a domain name with an IP address; and this can be the result of entering a URL field in a web browser or simply by launching a program that uses the Internet and, therefore, generates DNS queries in order to successfully communicate with the host or server. An illustrative DNS Query packet may include a MAC header, an IP header, a UDP header and a DNS section. The DNS section includes a DNS Query Section, which further includes a DNS name field that may be associated with a website URL A DNS Response is received by the client device from the previously generated DNS query. DNS responses come directly from the DNS server that received the DNS query. The illustrative DNS Response packet may also include a MAC header, an IP header, a UDP header and a DNS section. The DNS Response Section for the DNS Response packet includes an Answers Section, Authoritative Nameservers and Additional Records. Note, the Answers Section, Authoritative Nameservers and Additional Records share the same field. One of the fields shared by the DNS Response section is referred to as a "Type" field. Some of the most common Type of DNS information include a Type=A, which is associated with an IPv4 protocol that includes a 32-bit IP address for a host or domain. The Type field determines the type of information about a domain. A Type=AAAA indicates an IPv6 protocol, which has a 128-bit IP address.

Transmission Control Protocol (TCP) is a connection-oriented protocol which is suited for applications that require high reliability. The TCP protocol is used by other protocols such as HTTP, HTTPS, FTP, SMTP and Telnet. Thus, internet applications such as the World Wide Web, email, remote administration and file transfer use or rely on TCP. Applications that do not require a reliable data stream service may use the User Datagram Protocol (UDP), which provides a connectional datagram service that emphasizes reduced latency over reliability. TCP rearranges data packets in the order specified and there is a guarantee that the data transferred remains intact and arrives in the same order in which it was sent. TCP is a reliable stream delivery service which guarantees that all bytes received will be identical with bytes sent and in the correct order. In operation, the Transmission Control Protocol accepts data from a data stream and divides the data into chunks. TCP then adds a TCP header creating a TCP segment. The TCP segment is then encapsulated into an Internet Protocol (IP) datagram, and exchanged with peers.

As mobile data networks begin to rely more on IPv6 networks, the operators are increasing forcing the mobile devices that provide data services to communicate with mobile data networks using either the IPv4 protocol or the IPv6 protocol, but not both protocols. Thus, the Packet Data Protocol (PDP) bearer protocol that manages communications between the mobile device and an illustrative P-GW must use only an IPv4 protocol or an IPv6 protocol, but not both protocols. The purpose for only selecting one protocol for communication between the mobile device and the mobile data network is to simplify managing and controlling the mobile data network.

Mobile operating systems, the networking stack and mobile applications have been adapting to the mobile data networks transitioning to using the IPv6 protocol for their networking systems.

Figure 1:
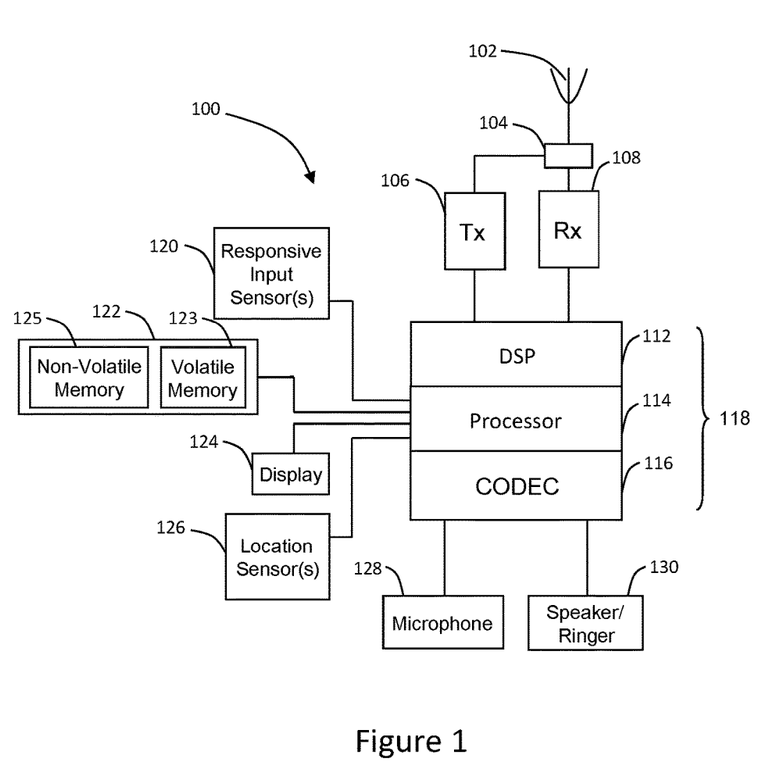
FIG. 1 shows an illustrative mobile device that is communicatively coupled to a mobile data network.

Referring to FIG. 1, there is shown an illustrative mobile device 100 that may be communicatively coupled to a mobile data network. For purposes of this patent, the illustrative mobile device 100 is a multimode wireless device that comprises a first antenna element 102 that is operatively coupled to a duplexer 104, which is operatively coupled to a multimode transmitter module 106, and a multimode receiver module 108.

An illustrative control module 118 comprises a digital signal processor (DSP) 112, a processor 114, and a CODEC 116 that are communicatively coupled to the transmitter 106 and receiver 108. It shall be appreciated by those of ordinary skill in the art that the transmitter module and receiver module are typically paired and may be embodied as a transceiver. The illustrative transmitter 106, receiver 108, or transceiver is communicatively coupled to antenna element 102.

The DSP 112 may be configured to perform a variety of operations such as controlling the antenna 102, the multimode transmitter module 106, and the multimode receiver module 108. The processor 114 is operatively coupled to a responsive input sensor 120 such as a keypad or a touch screen.

The processor 114 is also operatively coupled to a memory 122, a display 124, and a sensor 126. The sensor 126 may be used to determine an indoor and outside location for the illustrative wireless device.

Additionally, the processor 112 is also operatively coupled to the CODEC module 116 that performs the encoding and decoding operations and is communicatively coupled to a speaker 130 and a microphone 128. The CODEC module 116 is also communicatively coupled to the display 124 and provides the encoding and decoding operations for video.

The memory 122 includes two different types of memory, namely, volatile memory 123 and non-volatile memory 125. The volatile memory 123 is computer memory that requires power to maintain the stored information, such as random access memory (RAM). The non-volatile memory 125 can retain stored information even when the mobile device 100 is not powered up. Some illustrative examples of non-volatile memory 125 include flash memory, ROM memory, and hard drive memory.

Mobile device 100 may be a wireless device, mobile handset, mobile phone, wireless phone, portable cell phone, cellular phone, portable phone, a personal digital assistant (PDA), a tablet, a portable media device, a wearable computer, or any type of mobile terminal which is regularly carried by an end user and has all the elements necessary for operation in a wireless communication system. The wireless communications include, by way of example and not of limitation, CDMA, WCDMA, GSM, UMTS, or any other wireless communication system such as wireless local area network (WLAN), Wi-Fi or WiMAX.

Figure 2A:
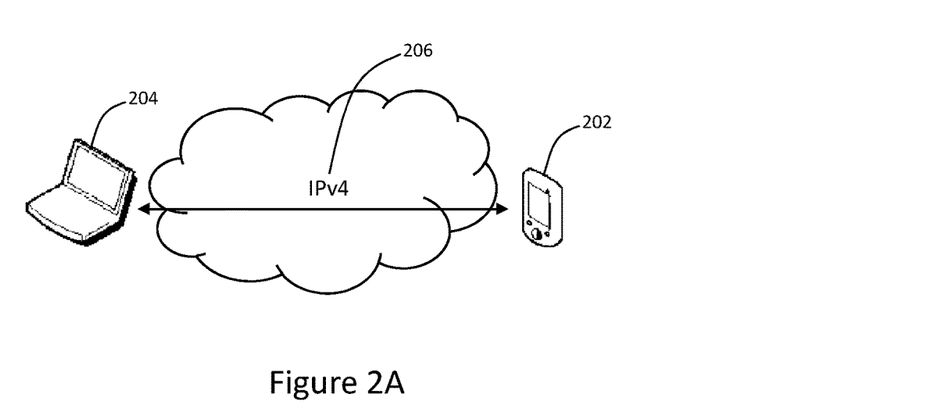
FIG. 2A shows an illustrative mobile device communicatively coupled to a computing device using an IPv4 protocol.

Referring now to FIG. 2A, there is shown an illustrative mobile device communicatively coupled to a computing device using an IPv4 protocol. More specifically, the illustrative mobile device 202 in an illustrative home setting. The illustrative computing device 204 is a laptop computer having a minimum of a CPU, memory that can run and operating system and a browser. The illustrative computing device 204 is tethered to the mobile device with an illustrative wireless WiFi connection, an illustrative wireless Bluetooth connection or an illustrative wired USB connection using an IPv4 protocol 206.

Figure 2B:
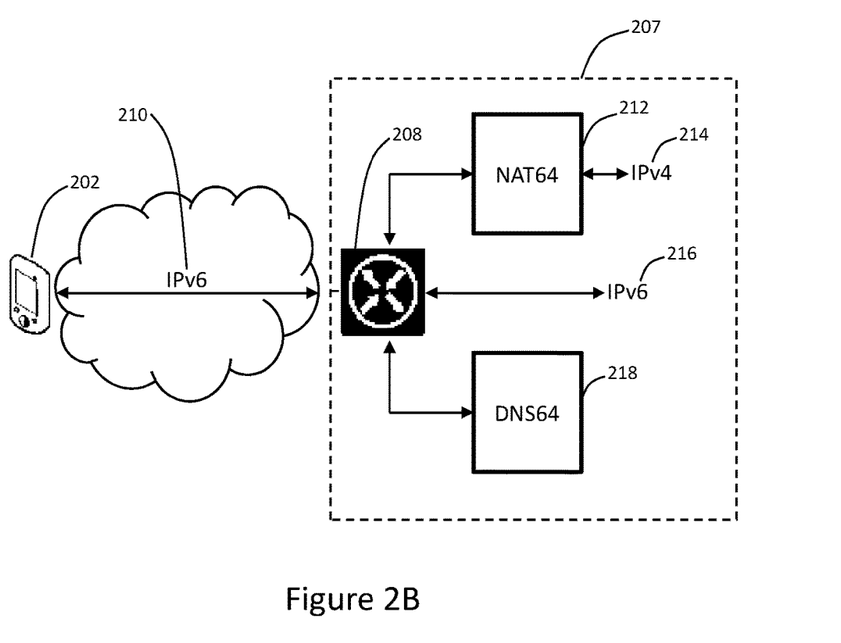
FIG. 2B there is shown the illustrative mobile device communicating with an illustrative mobile data network.

Referring to FIG. 2B there is shown the illustrative mobile device communicating with an illustrative mobile data network 207. In the illustrative embodiment, the mobile device 202 is communicatively coupled to an illustrative Packet Data Network Gateway (P-GW) 208, which performs the function of allocating IP addresses. The illustrative mobile device 202 may be connected to a plurality of P-GWs (not shown) depending the types of services being used. Additionally, the P-GW 208 provides connectivity from the mobile device 202 to external packet data networks by being the point of entry/exit of traffic for the mobile device 202. By way of example and not of limitation, the P-GW 208 manages policy enforcement, packet filtration for users, charging support, lawful Interception and packet screening.

The illustrative mobile data network also includes a NAT64 gateway 212. The NAT64 module 212 provides an IPv6 transition mechanism that facilitates communication between the IPv6 and the IPv4 hosts by using network address translation (NAT). In operation, the NAT64 gateway 212 operates as a translator between IPv4 and IPv6 protocols, for which it needs at least one IPv4 address and an IPv6 network segment comprising a 32-bit address space. The output from the NAT64 gateway 212 generates an IPv4 protocol 214.

The illustrative P-GW module 208 communicates with the mobile device 210 using the IPv6 protocol 210 and, thus, the output generated by the P-GW component may also be communicated to other mobile data network modules (not shown) using the IPv6 protocol 216.

P-GW module 208 may also be configured to communicate with DNS64 module 218. The illustrative DNS64 component 218 refers to an illustrative DNS server that when asked for AAAA records (IPv6 address), but only finds A records (IPv4 address), then the DNS server synthesizes AAAA (IPv6 address) from the A records (IPv4) records.

Mobile data networks are increasing forcing mobile devices, e.g. mobile 202, that provide data services to communicate using either the IPv4 protocol or the IPv6 protocol, but not both protocols. Thus, the Packet Data Protocol (PDP) bearer protocol 210 that manages communications between the mobile device and an illustrative P-GW must use only an IPv4 protocol or an IPv6 protocol, but not both protocols. In the illustrative embodiment presented herein the mobile device 202 is communicatively coupled to the P-GW 208 using an IPv6 protocol 210. However, the mobile device may also communicate with another PG-W module (not shown) using the IPv4 protocol.

The combination of different protocols that may be used as tethered domain protocols 206 and PDP bearer protocols 210 are presented in Table 1. The first combination of protocols, in which the tethered domain protocol is an IPv4 protocol and the PDP bearer protocol is an IPv4 protocol is a traditional protocol that is not applicable to the problem being solved by the systems and methods described herein. The second combination of protocols where the tethered domain protocol is an IPv6 protocol and the PDP bearer protocol is an IPv6 protocol is a rare protocol, since most tethered domain protocols do not rely on an IPv6 protocol. The third combination of protocols relies on a tethered IPv6 domain protocol and an IPv4, which is again a rare combination of protocols. The most applicable combination of protocols is presented in the fourth combination, in which the tethered domain protocol is an IPv4 protocol and the PDP bearer protocol is an IPv6 protocol; the systems and methods described herein detect the computing device 204 being tethered to the mobile device 202.

TABLE 1

| Tethered Domain Protocol | PDP Bearer Protocol | Remarks |
| --- | --- | --- |
| IPv4 | IPv4 | Not Applicable |
| IPv6 | IPv6 | Rare: Not Applicable |
| IPv6 | IPv4 | Not Supported |
| IPv4 | IPv6 | Applicable Scenario |

In the illustrative fourth combination, the mobile device 202 spoofs the mobile data network by performing as NAT/Router and as a table lookup device, which converts IPv4 addresses to IPv6 and vice versa; thereby enabling an unauthorized device 204 to access a mobile data plan by identifying the unauthorized device to be an authorized device. Network Address Translation (NAT) is a method of remapping one IP address into another by modifying the network address information in the IP datagram packet headers while they move across a router.

By way of example and not of limitation, the most common approach to convert IPv4 addresses to IPv6 addresses is to use stateless mapping as described in RFC 6145 and other related standards. RFC 6145 describes the stateless IP/ICMP translation algorithm, which translates between IPv4 and IPv6 packer header. In the stateless mode, a specific IPv6 address range will represent IPv4 systems (IPv4-converted addresses), and the IPv6 systems have addresses (IPv4-translatable addresses) that can be algorithmically mapped to a subset of the service provider's IPv4 addresses. Thus, the actual IPv4 address may be embedded in designated few bytes within an IPv6 address that starts with a pre-defined prefix and this information can be used by the algorithm to identify IPv4 addresses in the core even when they are in the IPv6 format.

As described in further detail below, the illustrative system and method presented herein detect a computing device being tethered to a mobile device, when the IPv4 protocol is used for communications between the computing device and the mobile device and when the IPv6 protocol is used for communications between the mobile device and the mobile data network.

In summary, the system and method for tethering detection is based applications running on the mobile device 202 that access the mobile data network use an IPv6 protocol; thus, the DNS lookup queries originating from mobile phones are of type AAAA, which is associated with an IPv6 protocol. Meanwhile, the DNS lookup queries originating from the tethered computing devices are of type A, which is associated with the IPv4 network protocol.

The system and method presented herein correlate the TCP flow with the preceding DNS query response and determine that the TCP flow as either tethered or untethered. Note that some applications running on mobile device require an IPv4 infrastructure as well and hence may be using CLAT (RFC6877: 464XLAT) services resulting in DNS type A queries being originated from the mobile device.

Figure 3A:
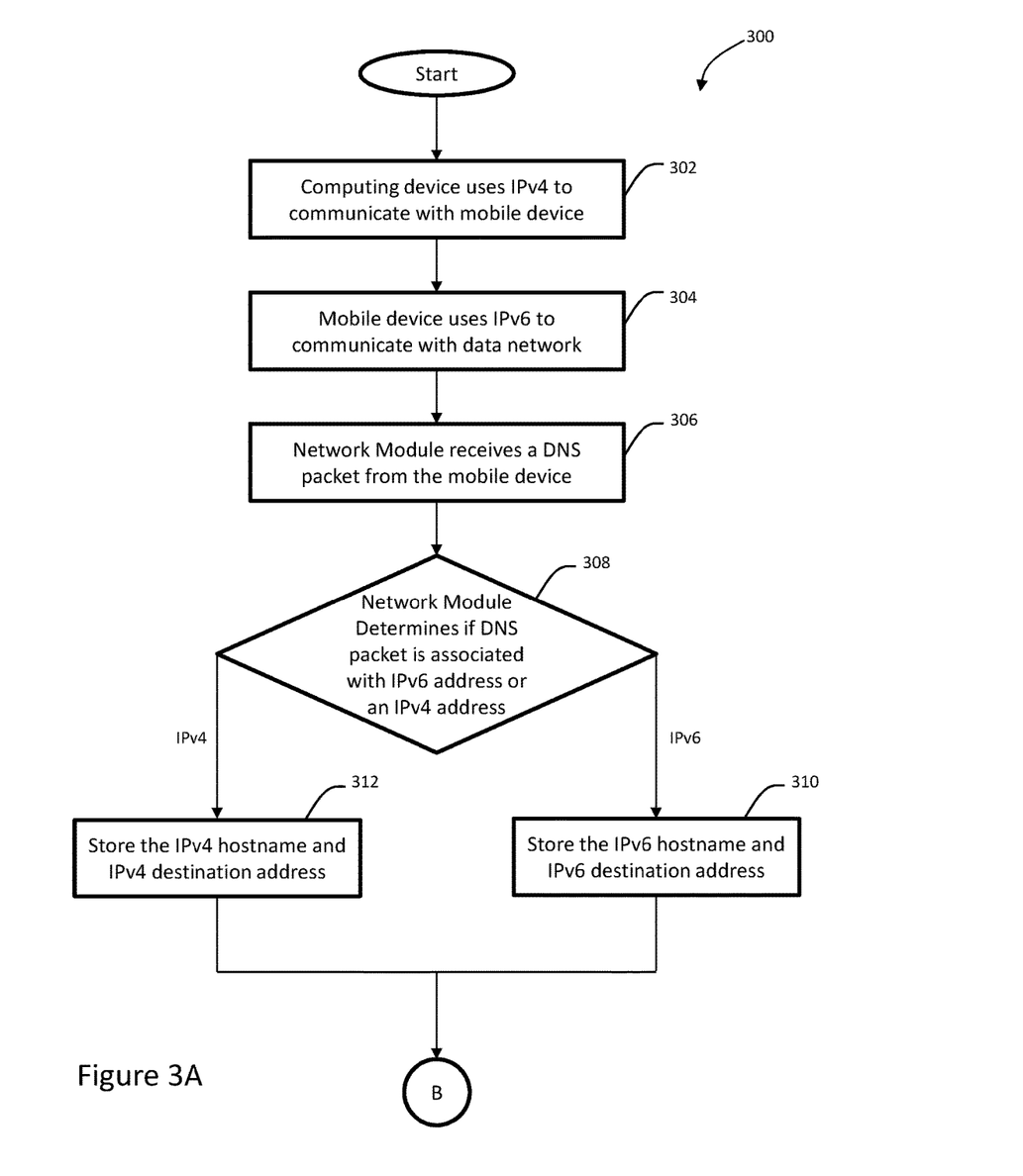
FIGS. 3A and 3B show an illustrative method for detecting a computing device tethered to a mobile device.
Figure 3B:
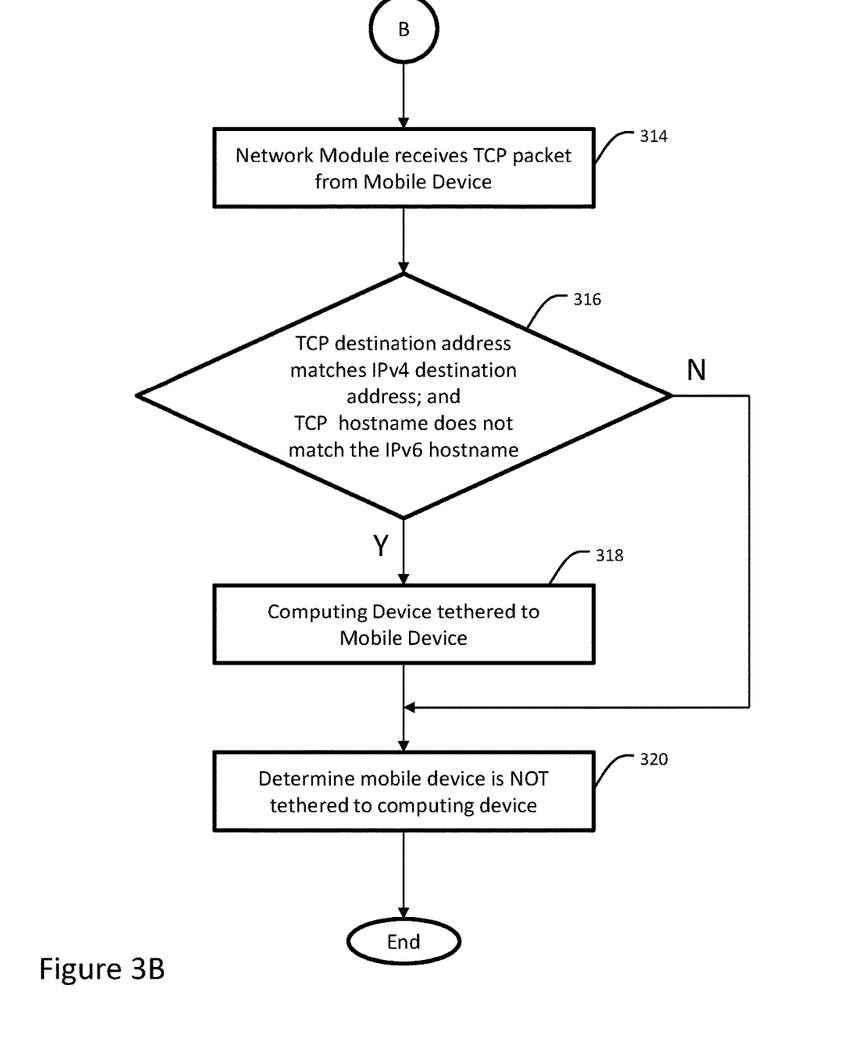

Referring now to FIG. 3A and FIG. 3B, there is shown an illustrative method 300 for detecting a computing device tethered to a mobile device. The illustrative steps corresponding to method 300 are performed with illustrative system 200.

In summary, the method is initiated when a network module, e.g. P-GW 208, receives a DNS response packet and the "type" field of the DNS response packet is checked. The P-GW network module 208 is provided for illustrative purposes only and the steps described herein may be performed in one or more network modules that are configured to communicate with the mobile device 202.

If the "type" field includes an AAAA, this indicates an IPv6 address, and the method proceeds to add the hostname and destination IP address to an illustrative IPv6DNSMap hash table. If the "type" field includes an A, this indicates an IPv4 address, and the method adds the hostname and destination IP address to an illustrative IPv4DNSMap hash table. The illustrative network module then proceeds to receive a TCP packet that includes a SYN message (received by the network module) and extracts the destination address from the TCP packet.

If the destination address is found in the illustrative IPv6DNSMap hash table, then the TCP packet flow is untethered because there is no IPv4 translation and so the mobile device is communicating directly with the mobile data network.

If the destination address is found in the illustrative IPv4DNSMap hash table (after conversion from IPv6 to IPv4) and the associated TCP hostname is found in the IPv6DNSMap, then the TCP flow is identified as being an IPv4 network protocol originated from the mobile device; therefore, the mobile device is untethered. Note, there are some applications running on the mobile device that need an IPv4 infrastructure as well and hence may be using CLAT (RFC6877: 464XLAT) services resulting in DNS type A queries originated from the mobile device.

If the destination address is found in the illustrative IPv4DNSMap hash table (after conversion from IPv6 to IPv4) and the associated TCP hostname is NOT found in the IPv6DNSMap, then the TCP flow is identified as being an IPv4 network protocol originated from the tethered computing device; therefore, the mobile device is tethered.

Finally, if the destination address is NOT found in the V4DNSMap hash table and V6DNSMap hash table, then the TCP flow is subject to further analysis. This situation may occur when a connectionless UDP protocol is utilized so there is no handshake. Thus, another illustrative system and method, which is not presented in this patent, may be utilized to detect tethering when the destination address is NOT found in the V4DNSMap hash table and V6DNSMap hash table.

An illustrative flowchart for the detecting the tethered computing device is presented in flowchart 300. Referring to FIG. 3A, the method is initiated at block 302, where the computing device 204 is communicatively coupled to the mobile 202 device using an IPv4 protocol. At block 304, the mobile device 202 is communicatively coupled to the mobile data network 207 with an IPv6 protocol. At block 306, the method then proceeds to enable the network module to receive DNS packets from the mobile device.

At decision diamond 308, the illustrative network module 208 determines whether the DNS packet is associated with either an IPv6 address or an IPv4 address. If an IPv6 address is detected, then the method proceed to block 310 where an IPv6 hostname and an IPv6 destination address is stored. If an IPv4 address is detected, the method moves to block 312 wherein an IPv4 hostname and an IPv4 destination address is stored. By way of example and not of limitation, the system and method generates an IPv6 hash table that includes the IPv6 hostname and the IPv6 destination address, and the method generates an IPv4 hash table that includes the IPv4 hostname and the IPv4 destination address.

The method then proceeds to FIG. 3B and block 314 where a TCP packet generated by the mobile device is received by the network module. The TCP packet includes a TCP destination address.

At decision diamond 316, the system and method determines whether the TCP destination address matches the IPv4 destination address and the TCP hostname does not match the IPv6 hostname. If the TCP destination address matches the IPv4 destination address and the TCP hostname does not match the IPv6 hostname, then the method proceeds to block 318 where the determination is made that the computing device is tethered to the mobile device.

If the conditions presented in decision diamond 316 are not satisfied, then the method proceeds to block 320 where a determination is made that the mobile device is not tethered to the computing device. The determination that the mobile device is not tethered may occur when the illustrative TCP destination address matches the IPv6 destination address. The mobile device may also be untethered when the TCP destination address matches the IPv4 address and the TCP hostname matches the IPv6 hostname. The mobile device may be further untethered when the TCP destination address does not match the IPv6 destination address and the IPv4 destination address.

The system and method described above is not limited to a TCP packet and may include detecting a communication packet generated by the mobile device, wherein the communication packet includes a destination address and a hostname. Additionally, the system and method determines the computing device is tethered to the mobile device, when the destination address matches the IPv4 destination address and the hostname does not match the IPv6 hostname.

The systems and methods described herein rely on DNS correlation with other communication data. However, not all the applications use DNS and, thus, not all applications can be detected with the system and methods described herein. For example, BitTorrent and other software applications that use string literals in protocol messages, e.g. some Skype flows, or other mechanisms to determine IP addresses.

Regardless, there are substantial benefits to relying on DNS correlation, namely, a big range of common software applications can be detected. By way of example and not of limitations, software applications that can be detected using the DNS correlation systems and method presented include cloud based solutions such as Netflix, Youtube, and other Yahoo and Google services. Additionally, the DNS correlation system and method prevent advanced spoofing applications that use a proxy to change the TCP/IP parameters that are presented to the mobile data network.

Additionally, the DNS correlation system and method presented herein can be modified using a variety of different parameters. For example, the systems and method presented herein can use the Time-to-Live (TTL) field from the DNS responses to decide the time for which the entry should be maintained in the V4DNSMap and V6DNSMap. Additionally, the systems and methods may use the exact source address of the DNS query and the TCP flow to identify Customer-side Translator (CLAT) flows. Furthermore, autoflushing (after a configurable timer) entries from the V4DNSMap and V6DNSMap and/or refreshing the entries when a new request for the same hostname may be utilized. Further still, a whitelist of hostnames (expressed via regular expressions) may be used for DNS entries that are populated in the V4DNSMap and V6DNSMap; this reduces the coverage of the algorithm but is a conservative approach to avoid false positives completely. Further yet, a blacklist of hostnames (expressed via regular expressions) may be applied to DNS entries that shall not be populated in the V4DNSMap and V6DNSMap; this reduces the coverage of the algorithm but is a useful approach to avoid false positives for known applications that misbehave. Further still, other blacklist and whitelists based on Type Allocation Code (TAC) or the mobile operating system versions can be used in conjunction with the systems and methods presented herein.

It is to be understood that the detailed description of illustrative embodiments are provided for illustrative purposes. Thus, the degree of software modularity for the systems and methods presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A method for detecting a computing device tethered without authorization to a mobile device, the method comprising:
   communicatively coupling the computing device to the mobile device with an IPv4 address;
   communicatively coupling the mobile device to a mobile data network with an IPv6 address;
   enabling a network module associated with a mobile data network to receive a DNS response packet associated with the mobile device;
   determining an IP address selected from an Ipv6 address and an IPv4 address for the DNS response packet;
   adding an IPv6 hostname and an IPv6 destination address when the DNS response packet is associated with the IPv6 address;
   adding an IPv4 hostname and an IPv4 destination address when the DNS response packet is associated with the IPv4 address;
   generating an IPv6 table that includes the IPv6 hostname and the IPv6 destination address;
   generating an IPv4 table that includes the IPv4 hostname and the IPv4 destination address;
   detecting a TCP packet generated by the mobile device, with the network module, wherein the TCP packet includes a TCP destination address and a TCP hostname; and
   determining the computing device is tethered without authorization to the mobile device, with the network module, when the TCP destination address matches the IPv4 destination address and the TCP hostname does not match the IPv6 hostname.

2. The method of claim 1 further comprising determining the computing device is untethered to the mobile device when the TCP destination address matches the IPv6 destination address.

3. The method of claim 1 further comprising determining the computing device is untethered to the mobile device when the TCP destination address matches the IPv4 address and the corresponding hostname matches the IPv6 hostname.

4. The method of claim 1 further comprising determining the computing device is untethered to the mobile device when the TCP destination address does not match the IPv6 destination address and the IPv4 destination address.

5. The method of claim 1 further comprising,
generating an IPv6 hash table that includes the IPv6 hostname and the IPv6 destination address, and
generating an IPv4 hash table that includes the IPv4 hostname and the IPv4 destination address.

6. A system for detecting a computing device tethered without authorization to a mobile device, the system comprising:
the computing device communicatively coupled to the mobile device with an Ipv4 domain protocol;
the mobile device communicatively coupled to a mobile data network with an Ipv6 domain protocol;
a network module associated with a mobile data network that is configured to receive a DNS response packet associated with the mobile device;
an IP address selected from an Ipv6 address and an Ipv4 address for the DNS response packet;
an Ipv6 hostname and an Ipv6 destination address associated with the DNS response packet when the DNS response packet is associated with the Ipv6 address;
an Ipv4 hostname and an Ipv4 destination address associated with the DNS response packet when the DNS response packet is associated with the Ipv4 address;
an Ipv6 table that includes the Ipv6 hostname and the Ipv6 destination address;
an Ipv4 table that includes the Ipv4 hostname and the Ipv4 destination address;
a TCP packet generated by the mobile device communicating with the network module, wherein the TCP packet includes a TCP destination address; and
wherein the computing device is tethered without authorization to the mobile device when the TCP destination address matches the Ipv4 destination address and the corresponding hostname does not match the Ipv6 hostname.

7. The system of claim 6 wherein the computing device is untethered to the mobile device when the TCP destination address matches the Ipv6 destination address.

8. The system of claim 6 wherein the computing device is untethered to the mobile device when the TCP destination address matches the Ipv4 address and the TCP hostname matches the Ipv6 hostname.

9. The system of claim 6 wherein the computing device is untethered to the mobile device when the TCP destination address does not match the Ipv6 address and the Ipv4 destination address.

10. The system of claim 6 further comprising,
an Ipv6 hash table that includes the IPv6 hostname and the Ipv6 destination address, and
an Ipv4 hash table that includes the Ipv4 hostname and the Ipv4 destination address.

11. A method for detecting a computing device tethered without authorization to a mobile device, the method comprising:
communicatively coupling the computing device to the mobile device with an Ipv4 address;
communicatively coupling the mobile device to a mobile data network with an Ipv6 address;
enabling a network module associated with a mobile data network to receive a DNS response packet associated with the mobile device;
determining an IP address selected from an Ipv6 address and an Ipv4 address for the DNS response packet;
adding an Ipv6 hostname and an Ipv6 destination address when the DNS response packet is associated with the Ipv6 address;
adding an Ipv4 hostname and an Ipv4 destination address when the DNS response packet is associated with the Ipv4 address;
generating an Ipv6 table that includes the Ipv6 hostname and the Ipv6 destination address;
generating an Ipv4 table that includes the Ipv4 hostname and the Ipv4 destination address;
detecting a communication packet generated by the mobile device, with the network module, wherein the communication packet includes a destination address and a hostname; and
determining the computing device is tethered without authorization to the mobile device, with the network module, when the destination address matches the Ipv4 destination address and the hostname does not match the Ipv6 hostname.

12. The method of claim 11 further comprising determining the computing device is untethered to the mobile device when the destination address matches the Ipv6 destination address.

13. The method of claim 11 further comprising determining the computing device is untethered to the mobile device when the destination address matches the Ipv4 address and the hostname matches the Ipv6 hostname.

14. The method of claim 11 further comprising determining the computing device is untethered to the mobile device when the destination address does not match the Ipv6 destination address and the Ipv4 destination address.

15. The method of claim 11 further comprising,
generating an Ipv6 hash table that includes the Ipv6 hostname and the Ipv6 destination address, and
generating an Ipv4 hash table that includes the Ipv4 hostname and the Ipv4 destination address.

16. A system for detecting a computing device tethered without authorization to a mobile device, the system comprising:
the computing device communicatively coupled to the mobile device with an Ipv4 domain protocol;
the mobile device communicatively coupled to a mobile data network with an Ipv6 domain protocol;
a network module associated with a mobile data network that is configured to receive a DNS response packet associated with the mobile device;
an IP address selected from an Ipv6 address and an Ipv4 address for the DNS response packet;
an Ipv6 hostname and an Ipv6 destination address associated with the DNS response packet when the DNS response packet is associated with the Ipv6 address;
an Ipv4 hostname and an Ipv4 destination address associated with the DNS response packet when the DNS response packet is associated with the Ipv4 address;
an Ipv6 table that includes the Ipv6 hostname and the Ipv6 destination address;
an Ipv4 table that includes the Ipv4 hostname and the Ipv4 destination address; and
a communication packet generated by the mobile device communicating with the network module, wherein the communication packet includes a destination address and a hostname;
wherein the computing device is tethered without authorization to the mobile device when the destination address matches the Ipv4 destination address and the hostname does not match the Ipv6 hostname.

17. The system of claim 16 wherein the computing device is untethered to the mobile device when the destination address matches the Ipv6 destination address.

18. The system of claim 16 wherein the computing device is untethered to the mobile device when the destination address matches the Ipv4 address and the hostname matches the Ipv6 hostname.

19. The system of claim 16 wherein the computing device is untethered to the mobile device when the destination address does not match the Ipv6 destination address and the Ipv4 destination address.

20. The system of claim 6 further comprising,
an Ipv6 hash table that includes the Ipv6 hostname and the Ipv6 destination address, and
an Ipv4 hash table that includes the Ipv4 hostname and the Ipv4 destination address.

\* \* \* \* \*